US012634271B2

(12) United States Patent
Han et al.

(10) Patent No.: US 12,634,271 B2
(45) Date of Patent: May 19, 2026

(54) USER DEVICE CHARACTERIZATION METHOD BASED ON NETWORK DATA TRAFFIC INFORMATION, AND NETWORK ACCESS CONTROL METHOD THEREOF

(71) Applicant: AIRCUVE INC., Seoul (KR)

(72) Inventors: You Serk Han, Gimpo-si (KR); Sang Hun Seok, Goyang-si (KR)

(73) Assignee: AIRCUVE INC., Seoul (KR)

( * ) Notice: Subject to any disclaimer, the term of this patent is extended or adjusted under 35 U.S.C. 154(b) by 65 days.

(21) Appl. No.: 18/799,824

(22) Filed: Aug. 9, 2024

(65) Prior Publication Data

US 2025/0385897 A1 Dec. 18, 2025

(51) Int. Cl.
*H04L 9/40* (2022.01)

(52) U.S. Cl.
CPC ..................................... *H04L 63/08* (2013.01)

(58) Field of Classification Search
CPC ....................................................... H04L 63/08
See application file for complete search history.

(56) References Cited

U.S. PATENT DOCUMENTS

| | | | | |
|---|---|---|---|---|
| 8,528,071 | B1 * | 9/2013 | Kwan | H04L 63/0876 726/14 |
| 11,070,376 | B2 * | 7/2021 | Uy | H04L 9/0866 |
| 11,303,636 | B2 * | 4/2022 | Back | H04W 12/084 |
| 12,164,525 | B2 * | 12/2024 | Spannhake, II | G06F 16/248 |
| 12,273,273 | B2 * | 4/2025 | Savarese | H04L 12/4641 |
| 2015/0304849 | A1 * | 10/2015 | Moon | H04W 12/06 455/411 |
| 2018/0248863 | A1 | 8/2018 | Kao et al. | |

| | | | | |
|---|---|---|---|---|
| 2020/0196143 | A1 * | 6/2020 | Woo | H04W 12/04 |
| 2022/0045841 | A1 * | 2/2022 | Keith, Jr. | G06V 40/20 |
| 2023/0114650 | A1 * | 4/2023 | Keith, Jr. | G06F 21/316 726/7 |
| 2023/0128081 | A1 * | 4/2023 | Tabet | G06N 5/022 706/12 |

FOREIGN PATENT DOCUMENTS

| | | |
|---|---|---|
| WO | 2015/036033 A1 | 3/2015 |

OTHER PUBLICATIONS

An Office Action mailed by the Korean Ministry of Intellectual Property on Jan. 19, 2026, which corresponds to Korean Patent Application No. 10-2024-0077983 and is related to U.S. Appl. No. 18/799,824.

* cited by examiner

*Primary Examiner* — Viral S Lakhia
(74) *Attorney, Agent, or Firm* — Studebaker Brackett PLLC

(57) ABSTRACT

Provided is a system for network access control. The system includes an authentication server configured to perform a basic authentication procedure for a user by communicating with at least one user terminal, a service server configured to provide a service to at least one user terminal passing through the basic authentication procedure, a collection device configured to acquire traffic data of the at least one user terminal passing through the basic authentication procedure from at least one of the service server and a network interface connected to the service server, acquire a traffic dataset by refining the acquired traffic data in accordance with correlation, and extract time-series feature points of the traffic dataset, and an artificial intelligence (AI) management device configured to train at least one AI model to define a traffic character template of the user on the basis of the time-series feature points.

5 Claims, 6 Drawing Sheets

FIG. 4

USER DEVICE CHARACTERIZATION METHOD BASED ON NETWORK DATA TRAFFIC INFORMATION, AND NETWORK ACCESS CONTROL METHOD THEREOF

CROSS-REFERENCE TO RELATED APPLICATION

This application claims priority to and the benefit of Korean Patent Application No. 10-2024-0077983, filed on Jun. 17, 2024, the disclosure of which is incorporated herein by reference in its entirety.

BACKGROUND

1. Field of the Invention

The present disclosure relates to a system and method for network access control, and more particularly, to a technology for monitoring data traffic of a user to detect identity theft or hacking.

2. Discussion of Related Art

Business models are emerging to apply artificial intelligence (AI)/machine learning (ML) technologies to data network equipment to provide better performance and user experience. Also, the emergence of AI/ML-based hacker technologies has created an environment that is difficult to defend with network security technologies according to the related art. In the area of user authentication security, AI technologies (deep fake and the like) for forging user authentication and identification at service access points are becoming a new security threat to existing network protection schemes.

To simplify a repetitive authentication process, existing service login systems usually use a single sign on (SSO) system to issue an access token after authenticating a user once, and access requests that present the token may be authorized with no additional authentication procedure. However, such authentication systems are vulnerable to the threat of tokens being stolen and used, and thus zero-trust-based security requirements that require user trust processes to be performed at all service access points are becoming more common. In this case, frequent authentication requests reduce the convenience of using the service and increase the possibility of the means of authentication being exposed.

Also, AI/ML technologies according to the related art employ a network security method (blacklist method) of creating an abnormal behavior detection model through network traffic analysis, detecting a threat on the basis of the applied model, and isolating a device that has generated the traffic. However, there are increasing threats that evade abnormal behavior detection with AI-based intelligent attacks.

SUMMARY OF THE INVENTION

The present disclosure is directed to providing a network access control system that performs training using various context of a user's network access terminal, such as data traffic usage characteristics and authentication history, on the basis of artificial intelligence (AI)/machine learning (ML) technologies, generates a user-specific profile in accordance with the traffic characteristics as template data, and completes an AI model by performing training using the generated template data.

The present disclosure is also directed to providing a network access control method for detecting identity theft based on a deep fake by determining the similarity between characteristic information of real-time user traffic and a template model, and when there is a probability of identity theft, blocking a network session and then performing enhanced reauthentication.

Objects of the present disclosure are not limited to those described above, and other objects and advantages of the present disclosure that have not been described may be understood from the following description and will be understood more clearly from exemplary embodiments of the present disclosure. Also, objects and advantages of the present disclosure may be easily implemented by means described in the claims and combinations thereof.

According to an aspect of the present disclosure, there is provided a system for network access control, the system including a service server configured to provide a service to at least one user terminal, a collection device configured to acquire traffic data of the at least one user terminal from at least one of the service server and a network interface connected to the service server, acquire a traffic dataset by refining the acquired traffic data in accordance with correlation, and extract time-series feature points of the traffic dataset, an AI management device configured to train at least one AI model to define a traffic character template of the user on the basis of the time-series feature points, and an authentication server configured to determine whether the periodically extracted time-series feature points correspond to the user's usage characteristics depending on a comparison result between time-series feature points periodically extracted by the collection device and the traffic character template of the user.

The collection device may extract the user's feature points regarding each of a plurality of time-series items acquired in accordance with a feature point element including at least one of a data usage characteristic, a data transmission volume characteristic, an application usage characteristic, and a terminal characteristic.

In this case, the AI model may generate the traffic character template of the user in accordance with a distance vector based on a difference between the user's feature points and a distribution of a plurality of user's feature points regarding each of the plurality of time-series items.

The authentication server may perform a basic authentication procedure of at least one terminal matching the user, and when the terminal passes through the basic authentication procedure and it is determined that the traffic data of the terminal does not correspond to the user's usage characteristics as a result of comparison with the traffic character template of the user, set the terminal as an abnormal terminal and transmit a control message to the service server or the network interface to block a connection with the abnormal terminal.

In this case, the authentication server may communicate with the abnormal terminal to additionally perform an enhanced authentication procedure which differs from the basic authentication procedure, and when the abnormal terminal passes through the enhanced authentication procedure, the AI management device may train the AI model on the basis of the traffic data of the abnormal terminal to update the traffic character template of the user.

The authentication server may compare the periodically extracted time-series feature points with the traffic character template of the user through the AI model to acquire similarity and determine whether the periodically extracted time-series feature points correspond to the user's usage characteristics on the basis of the similarity.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which:

FIG. 4 is a sequence diagram illustrating a process in which the system compares traffic data of a user with usage characteristics of the user according to an exemplary embodiment of the present disclosure.

DETAILED DESCRIPTION OF EXEMPLARY EMBODIMENTS

Figure 1:
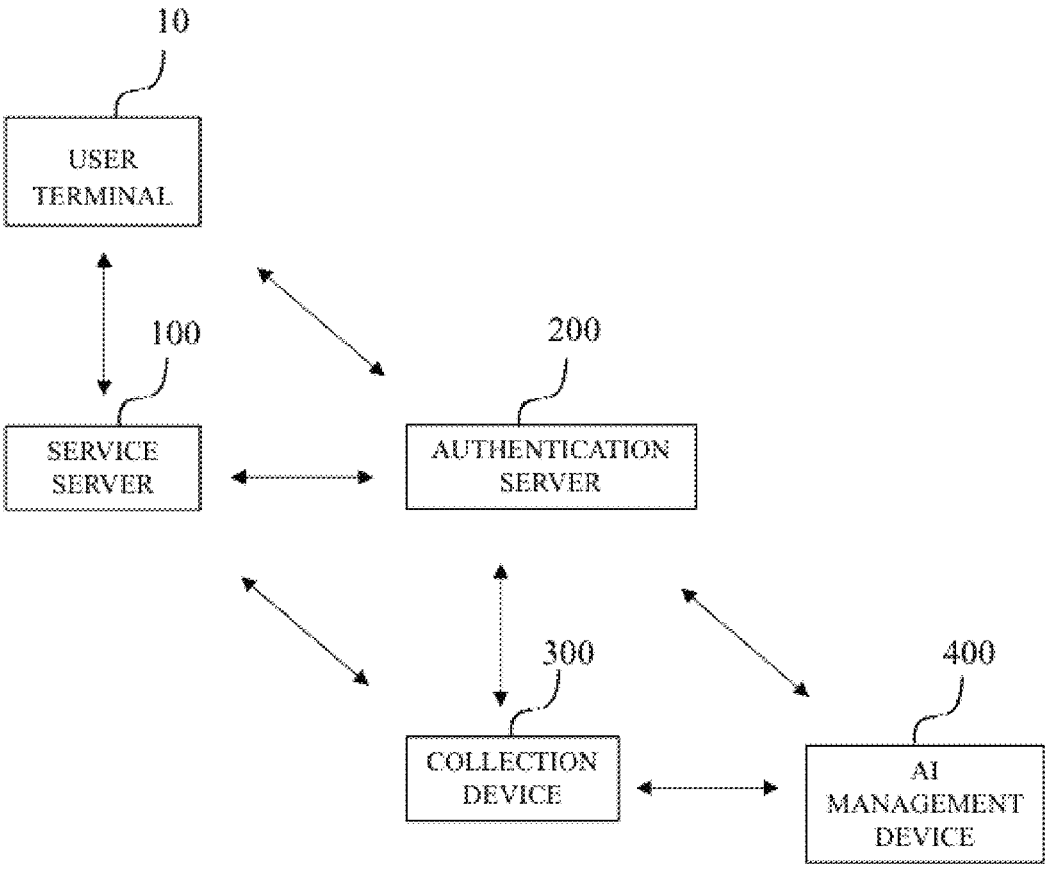
FIG. 1 is a block diagram of a network access control system according to an exemplary embodiment of the present disclosure.

Prior to describing the present disclosure in detail, a presentation method of this specification and drawings will be described.

First, as terms used herein and in the claims, general terms are selected in consideration of functions in various embodiments of the present disclosure. However, these terms may vary depending on the intention of an engineer working in the corresponding technical field, a legal or technical interpretation, the advent of new technology, or the like. Some terms are arbitrarily chosen by the applicant. These terms may be interpreted with meanings defined herein, and in the absence of detailed definitions, may also be interpreted on the basis of the overall content of this specification and common knowledge in the art.

Also, the same reference numerals or symbols in the drawings accompanying this specification indicate parts of components that perform substantially the same function. For convenience of description and understanding, the same reference numerals or symbols will be used in different embodiments. In other words, even when all components having the same reference numerals are shown in a plurality of drawings, it does not mean that the plurality of drawings are a single embodiment.

In addition, in this specification and the claims, terms including ordinal numbers, such as "first," "second," and the like, may be used to distinguish components. These ordinal numbers are used to distinguish the same or similar components from each other, and the meanings of the terms should not be construed as limited due to the use of these ordinal numbers. For example, components combined with such ordinal numbers should not be construed as limiting the order of use or arrangement by the ordinal number. The ordinal numbers may be used interchangeably, as necessary.

In this specification, the singular forms include plural forms unless the context clearly indicates otherwise. It should be understood that the term "include," "constitute," or the like specifies the presence of stated features, numbers, steps, operations, components, parts, or combinations thereof, but does not preclude the possibility of the presence or addition of one or more other features, numbers, steps, operations, components, parts, or combinations thereof.

In embodiments of the present disclosure, the terms "module," "unit," "part," and the like refer to a component that performs at least one function or operation, which may be implemented by hardware, software, or a combination of hardware and software. In addition, a plurality of "modules," "units," "parts," or the like may be integrated into at least one module or chip and implemented by at least one processor, except when it is necessary to implement each of them as individual specific hardware.

In embodiments of the present disclosure, when a part is referred to as being "connected" to another part, the parts may be directly connected or indirectly connected through an intervening medium. Also, when a part is referred to as "including" a component, this means that the part may include other components, rather than excluding other components unless specifically stated otherwise.

FIG. 1 is a block diagram of a network access control system according to an exemplary embodiment of the present disclosure.

Referring to FIG. 1, the network access control system may include a service server 100, an authentication server 200, a collection device 300, an artificial intelligence (AI) management device 400, and the like.

The service server 100 may provide at least one service to a user through at least one user terminal 10.

Here, the service server 100 may provide the service assuming that a basic authentication procedure is performed. Specifically, the service server 100 may be a server including various types of websites that require login via user identity authentication.

For example, when a service request is received from the user terminal 10, the service server 100 may request a basic authentication procedure in accordance with a personal permission policy from the authentication server 200. In this case, the authentication server 200 may perform a basic authentication procedure in accordance with one of various methods such as a password, a security token, a mobile authentication procedure (e.g., transmit a security code→input the security code through the service server-→verify the security code), or the like.

Alternatively, the service server 100 itself may perform a simple basic authentication procedure (e.g., input of an identifier (ID) and password).

The user terminal 10 may correspond to terminal devices of various users and receive a service from the service server 100 through at least one webpage or application provided by the service server 100.

The authentication server 200 is a server for performing various types of authentication of users. The authentication server 200 may communicate with the user terminal 10 to not only perform the above-described basic authentication procedure but also additionally perform a user identification or enhanced authentication procedure or the like based on traffic data analysis in accordance with various embodiments that will be described below.

The user terminal 10 that accesses a network of the service server 100 to exchange data and use the service has tendencies in accordance with the usage characteristics (behavior-based characteristics) of the user, and the network access control system of the present disclosure may extract features with these tendencies from data traffic generated by a network and generate a time-series traffic (temporally varying characteristics) character template for each user. Subsequently, an identification procedure for periodically receiving data traffic information of the user from network communication equipment located in a path through which user data is transmitted and received or the service server 100 accessed by the user, and comparing feature points with the traffic character template to determine whether the periodically received data traffic information corresponds to the user's own network usage characteristics may be automatically performed.

In this regard, the collection device 300 is a device for collecting traffic data of the user terminal 10 that is in the process of receiving the service.

The collection device 300 may receive traffic data of a user terminal from the service server 100 or a network interface connected to the service server 100.

Then, the collection device 300 may refine the collected data on the basis of context metadata. In this regard, the collection device 300 may generate the context metadata on the basis of all features of the environment such as features of the network through which the traffic data is transmitted and received, a usage pattern of the user, and the like.

The AI management device 400 corresponds to a server for performing AI training. Specifically, the AI management device 400 may train at least one AI model to define a traffic character template for specifying a user on the basis of traffic data of the user collected by the collection device 300.

To this end, a machine learning (ML) may be used in supervised learning and/or non-supervised learning. Specifically, the AI management device 400 may store at least one AI model for analyzing a pattern or time-series characteristics of traffic data on the basis of a deep learning model, such as a convolutional neural network (CNN), a recurrent neural network (RNN), a long short-term memory (LSTM), or the like, and defining a traffic character template for each user.

Each of the above-described devices 100, 200, 300, and 400 constituting the network access control system of the present disclosure may include a memory, a communicator, a processor, and the like.

The memory is an element for storing an operating system (OS) for controlling overall operations of components of each device and at least one instruction or data related to components of each device.

The memory may include a non-volatile memory, such as a read-only memory (ROM), a flash memory, or the like, or a non-volatile memory such as a dynamic random access memory (DRAM) or the like. Also, the memory may include a hard disk drive (HDD), a solid state drive (SDD), or the like.

The communicator may include a circuit, a module, a chip, and the like for communicating with at least one external device using various wired or wireless communication methods.

The communicator may be connected to external devices through various networks.

Networks may be a personal area network (PAN), a local area network (LAN), a wide area network (WAN), and the like depending on their areas or sizes, or may be an intranet, an extranet, the Internet, and the like depending on their openness.

The communicator may be connected to external devices using various wireless communication methods such as Long Term Evolution (LTE), LTE Advanced (LTE-A), Fifth Generation (5G) mobile communication, code division multiple access (CDMA), wideband CDMA (WCDMA), Universal Mobile Telecommunications System (UMTS), wireless broadband (WiBro), Global System for Mobile Communications (GSM), time division multiple access (TDMA), Wi-Fi, WiFi direct, Bluetooth, near field communication (NFC), ZigBee, and the like.

The communicator may be connected to external devices using various wired communication methods such as Ethernet, the Internet, Universal Serial Bus (USB), high-definition multimedia interface (HDMI), Thunderbolt, and the like.

The processor is an element for overall control of each device. Specifically, the processor is connected to the memory and may perform operations in accordance with various embodiments of the present disclosure by executing at least one instruction stored in the memory.

The processor may be implemented as a digital signal processor (DSP), a microprocessor, or a time controller (TCON). However, the processor is not limited thereto and may include one or more of a central processing unit (CPU), a microcontroller unit (MCU), a micro processing unit (MPU), a controller, an application processor (AP), a communication processor (CP), and an Advanced Reduced Instruction Set Computer (RISC) Machine (ARM) processor or may be defined with a term corresponding thereto. Also, the processor may be implemented as a system on chip (SoC) having processing algorithms embedded therein or a large-scale integration (LSI) chip or may be implemented in the form of a field programmable gate array (FPGA). Also, the processor may include a dedicated graphics processor, such as a graphics processing unit (GPU), a vision processing unit (VPU), or the like, or a dedicated AI processor such as a neural processing unit (NPU) or the like. The dedicated AI processor may be designed in a hardware structure specialized to train or use a specific AI model.

Figure 2A:
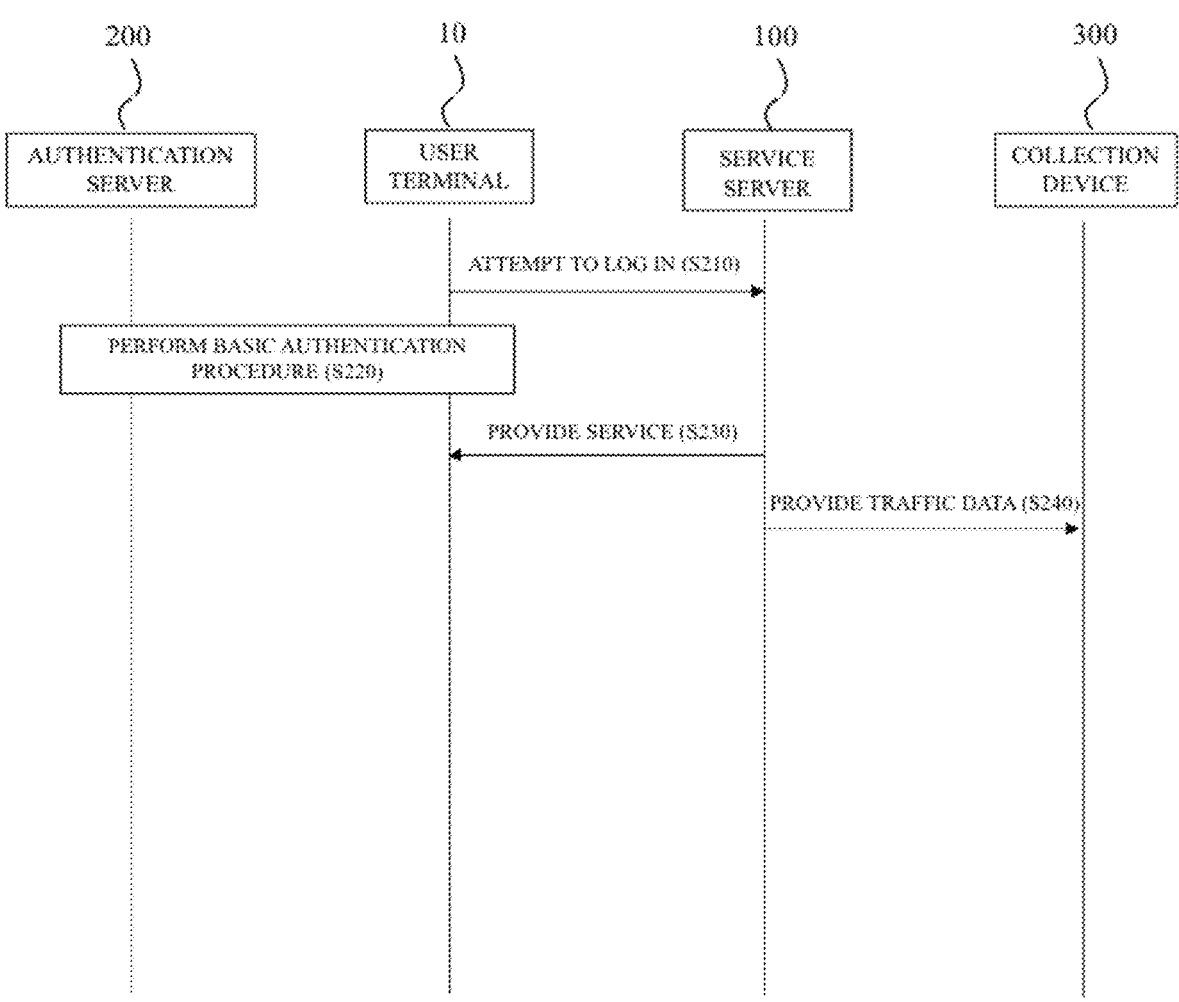
FIG. 2A is a sequence diagram illustrating a procedure in which the system collects traffic data during a service provision process according to an exemplary embodiment of the present disclosure.

FIG. 2A is a sequence diagram illustrating a procedure in which the system collects traffic data during a service provision process according to an exemplary embodiment of the present disclosure.

Referring to FIG. 2A, the user terminal 10 may attempt to log in to a service of the service server 100 (S210).

Here, the service server 100 may request a basic authentication procedure for login from the authentication server 200, and the authentication server 200 may communicate with the user terminal 10 to perform the basic authentication procedure (S220).

However, in the basic authentication procedure, the service server 100 may perform the basic authentication procedure alone without the authentication server 200.

When the user terminal 10 successfully passes through the basic authentication procedure, the service server 100 may provide at least one service to the user terminal 10 (S230).

During a process of providing the service, the collection device 300 may acquire traffic data of the user terminal 10 that utilizes the service (S240). Specifically, the collection device 300 may receive traffic data by communicating with the service server 100 or at least one network interface that relays or manages traffic between the service server 100 and the user terminal 10.

Table 1 below shows examples of traffic data that is received from the network interface or the service server 100 (service client) by the collection device 300. However, Table 1 shows examples of traffic data collection based on data attributes, and the present disclosure is not limited thereto.

TABLE 1

| Collecting entity | Processing method | Data | Description |
|---|---|---|---|
| Network interface (router, switch port mirroring, and the like) | Trim | User data traffic | Only collect header information of two to four network layers |
| | | Network management packets | Exclude |
| | Insert | Scope(id) | Give data in accordance with location of collection |
| | | Correlation (key, value) | Give correlation between collected data {context metadata} |
| | | Date(time) | Show data up to milliseconds |
| | Replace | User Device IP + MAC address | Replace data with SHA256 value |
| Service client (proxy or service providing server) | Trim | User data traffic | Collect header information of three to seven network layers (source IP/port, access application, URL information) |
| | Insert | Scope(id) | Give data in accordance with location of collection |
| | | Correlation (key, value) | Give correlation between collected data {context metadata} |
| | | Date(time) | Show data up to milliseconds |
| | Replace | User device IP + MAC address | Replace data with SHA256 value |

As a result of applying packet header information collection and replacement-based data collection only to a specific layer of a user's data traffic as shown in Table 1 above, personal information is not exposed, and it is easy to analyze traffic data which is under control of network equipment in real time. For example, the second to fourth layers (the data link layer, the network layer, and the transport layer) may be utilized in the case of collecting data from network equipment, and the third to seventh layers (the transport layer, the session layer, the presentation layer, and the application layer) may be utilized in the case of collecting data from a service server (including a proxy server), but the present disclosure is not limited thereto.

Figure 2B:
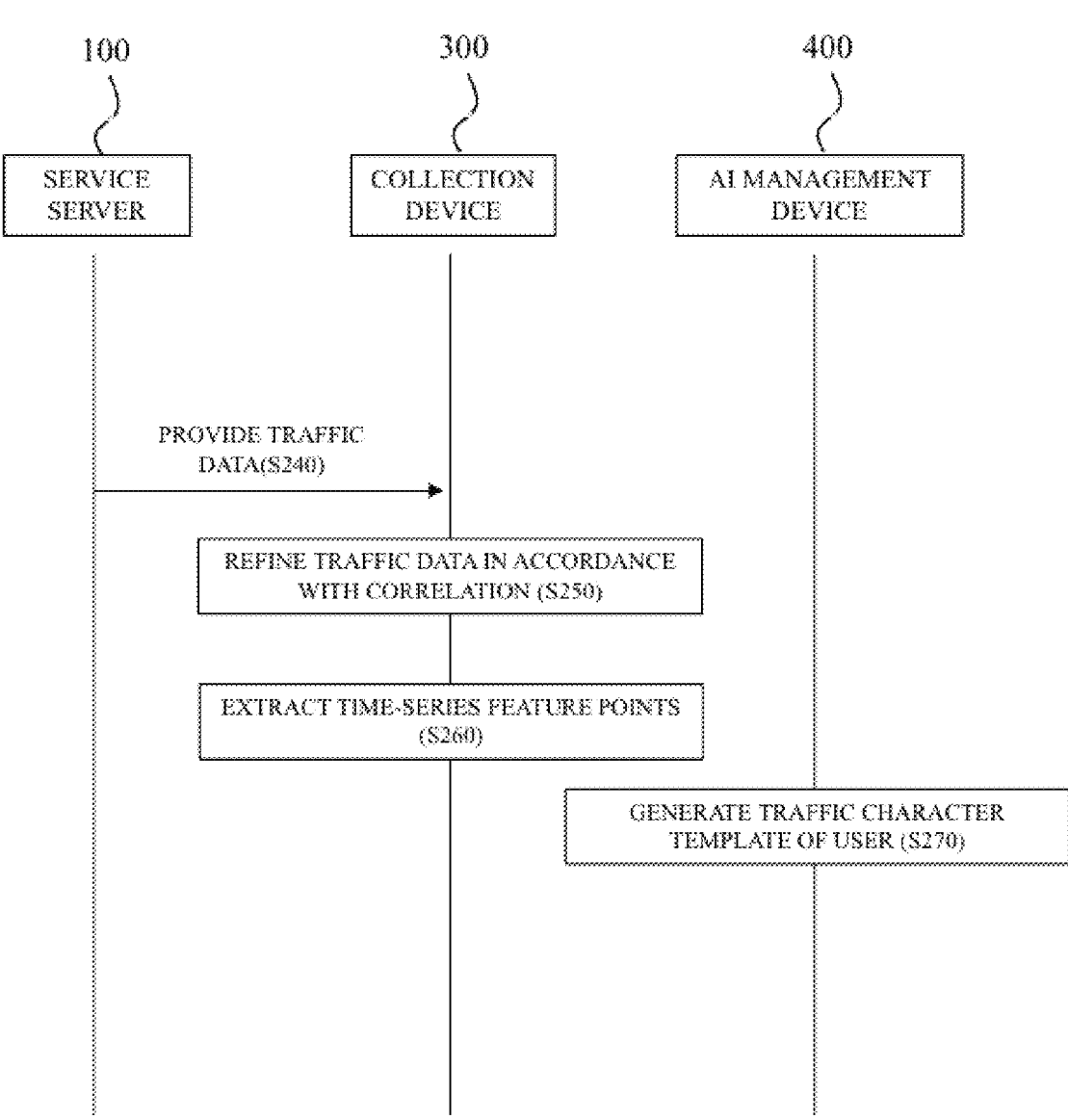
FIG. 2B is a sequence diagram illustrating a procedure in which the system generates a traffic character template of a user on the basis of traffic data collected during a service provision process according to an exemplary embodiment of the present disclosure.

Meanwhile, FIG. 2B is a sequence diagram illustrating a procedure in which the system generates a traffic character template of a user on the basis of traffic data collected during a service provision process according to an exemplary embodiment of the present disclosure.

When the traffic data is collected as illustrated in FIG. 2A (S240), the collection device 300 may acquire a traffic dataset by refining the traffic data in accordance with correlation (the correlation between the application and the service) (S250). The traffic dataset corresponds to training data for training an AI model that will be described below. The refining operation of traffic data may be extended in accordance with a function defined on the basis of context metadata of Table 1 above.

According to an exemplary embodiment, the collection device 300 may refine data by a plurality of data items (data names) as shown in Table 2 below, but the present disclosure is not limited thereto.

TABLE 2

| Data name | Description | Notes |
|---|---|---|
| Traffic ID | Terminal IP + MAC | |
| Correlation key | Correlation analysis key | Grouping factor in traffic ID |
| Correlation value | Analysis value | |
| Scope ID | Location of collection | |
| Date | Time of collection | In msec units |
| DNS | DNS packet query value | |
| URL | HTTP URL | |
| Packet_Snd_byte_m | Amount of data transmitted in last one minute | |
| Packet_Snd_Num_m | Number of transmissions in last one minute | |
| Packet_Rsv_byte_m | Amount of data received in last one minute | |
| Packet_Rsv_Num_m | Number of receptions in last one minute | |
| Service_Node_ID | Service being used/APP IP + hostname | |
| Distance-location | Location information | Proportional vector value of BL |
| Time difference | Transmission reference for each service/APP | Time difference from previous transmission packet in milliseconds |

In the above example, Internet protocol (IP)-based location information database interoperation may be used for distance-location information, and a method of generating a transmission order on the basis of correlation keys and recording a time difference from a previous transmission packet may be used for temporal difference information.

A correlation key may be generated with reference to a context metadata definition file. For example, when there is an application_correlation key for distinguishing similar applications/services that are analyzed to correlate with each other, a value of the key may be defined as a code value in context metadata. For example, code values may be set to 101(Office365), 201(groupware), 301(Naver), 302(Daum), 401(Zoom), and the like, and the classification system may be differently defined by an administrator.

When the refining is performed in this way, the collection device 300 may extract time-series feature points from the traffic dataset of which refining has been completed (S260).

Specifically, the collection device 300 may extract feature points of the user regarding a plurality of time-series items acquired in accordance with feature point elements including at least one of a data usage characteristic, a data transmission volume characteristic, an application usage characteristic, and a terminal characteristic. For example, feature points may be extracted as shown in Table 3 below, but the plurality of time-series items may be combined in various forms in accordance with characteristics of application environments.

TABLE 3

| Feature point elements | Description | Feature point extraction |
|---|---|---|
| Data usage characteristic | Data usage trends by time and application | APP_byte_m (per minute trend) APP_byte_h (per hour trend) APP_byte_d (per day trend) APP_byte_w (trend by day of week) |
| Data transmission volume characteristic | Trends of transmission packet counts by time and application | APP_cnt_m (per minute trend) APP_cnt_h (per hour trend) APP_cnt_d (per day trend) APP_cnt_w (trend by day of week) |
| APP usage characteristic | Usage characteristic trends by correlation APP | APP_cnt_max/avg/min (frequency of use) APP_time_max/avg/min (time of use) APP_gap_max/avg/min (interval of use) |
| Terminal characteristic | Terminal information characteristic of user | Type of terminal and whether type of terminal is changed in each time slot Whether access location is changed and distance from access location in each time slot IP information and whether IP information is changed in each time slot |

Then, the AI management device 400 may define or generate a traffic character template of the user on the basis of the above-described time-series feature points (S270).

Specifically, the AI management device 400 employs a method of calculating distance vectors for time-series characteristic values of each individual user regarding each time-series item on the basis of time-series characteristic value distribution over the entire data collection scope and generating feature points from the distance vectors through an AI model. In this way, the AI management device 400 may generate a user-specific template from relative characteristic values on the basis of characteristic values of the entire scope.

Here, the AI management device 400 may use feature point element data combined in various forms as training data to classify users into a variety of character types in accordance with a set size of the scope (e.g., when there are 100 users in the scope, the users may be classified into 100 or more types, for example, 128, 256, or more types). Here, each individual user's data may converge on a specific character type to generate an AI model (traffic telemetry characterization (TTC) model) for identifying each individual from traffic data.

Within the scope in which the collection device 300 collects traffic data, a traffic character convergence value of each user is learned as each character type. Accordingly, the AI model may be repeatedly trained such that only one user or less finally substitutes for a delimiter (a character type) based on a similarity allowance (tolerance) for identifying each user within the same scope. With the repeated training, it is possible to derive a traffic character template that amply reflects various behavior characteristics (traffic data) of each user.

Figure 3:
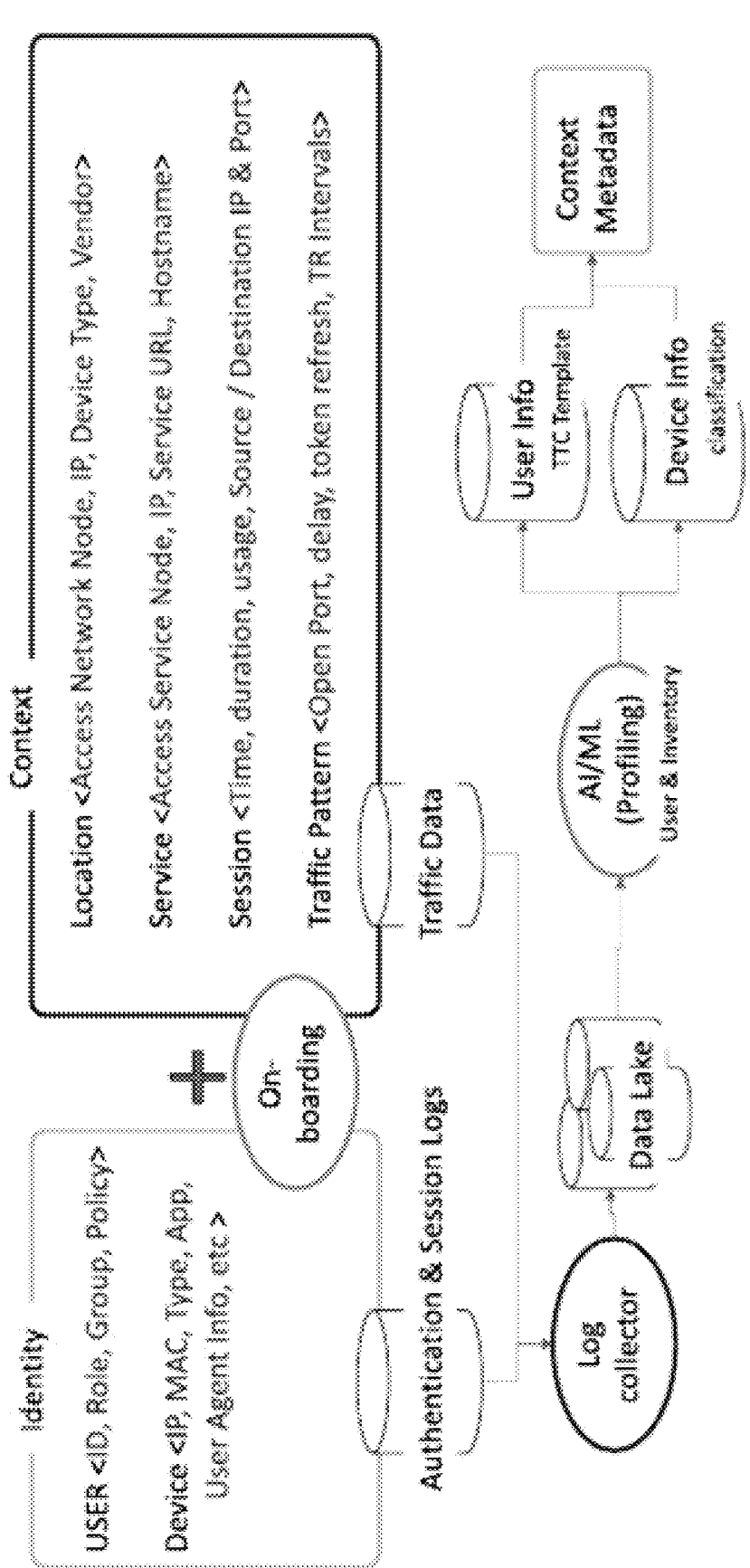
FIG. 3 is a diagram illustrating the concept of traffic telemetry characterization implemented by the system through an artificial intelligence (AI) model according to an exemplary embodiment of the present disclosure.

FIG. 3 is a diagram illustrating the concept of traffic telemetry characterization implemented by the system through an AI model according to an exemplary embodiment of the present disclosure.

Referring to FIG. 3, a basic authentication procedure may be performed through the service server 100 and the authentication server 200 on the basis of IDs of a user and a device, and a session for providing a service may be activated to collect traffic data (a log).

Here, the collection device 300 may generate context metadata that reflects features of a traffic collection network and features of all environments, such as a user usage pattern and the like, define a unit range for traffic character analysis as a scope, and collect all traffic data to be analyzed in the scope.

In other words, the collection device 300 may combine telemetry statistical information obtained by analyzing traffic information of individual users who access a network and log and session information collected during the access process of the users and generate a traffic dataset through an automated labeling task based on the context metadata.

Also, the AI management device 400 may train an AI model on the basis of the generated traffic dataset to build a TTC model.

Here, the AI management device 400 may analytically process network traffic data of the entire scope (traffic data collection area) to generate each individual user's traffic character template on the basis of character points. Here, each individual user's traffic character template may be generated with reference to the context metadata and scope template data.

A process of determining whether collected traffic data corresponds to a user's usage characteristics on the basis of a traffic character template defined in accordance with at least one of the above-described embodiments will be described below with reference to the drawings.

Figure 4:
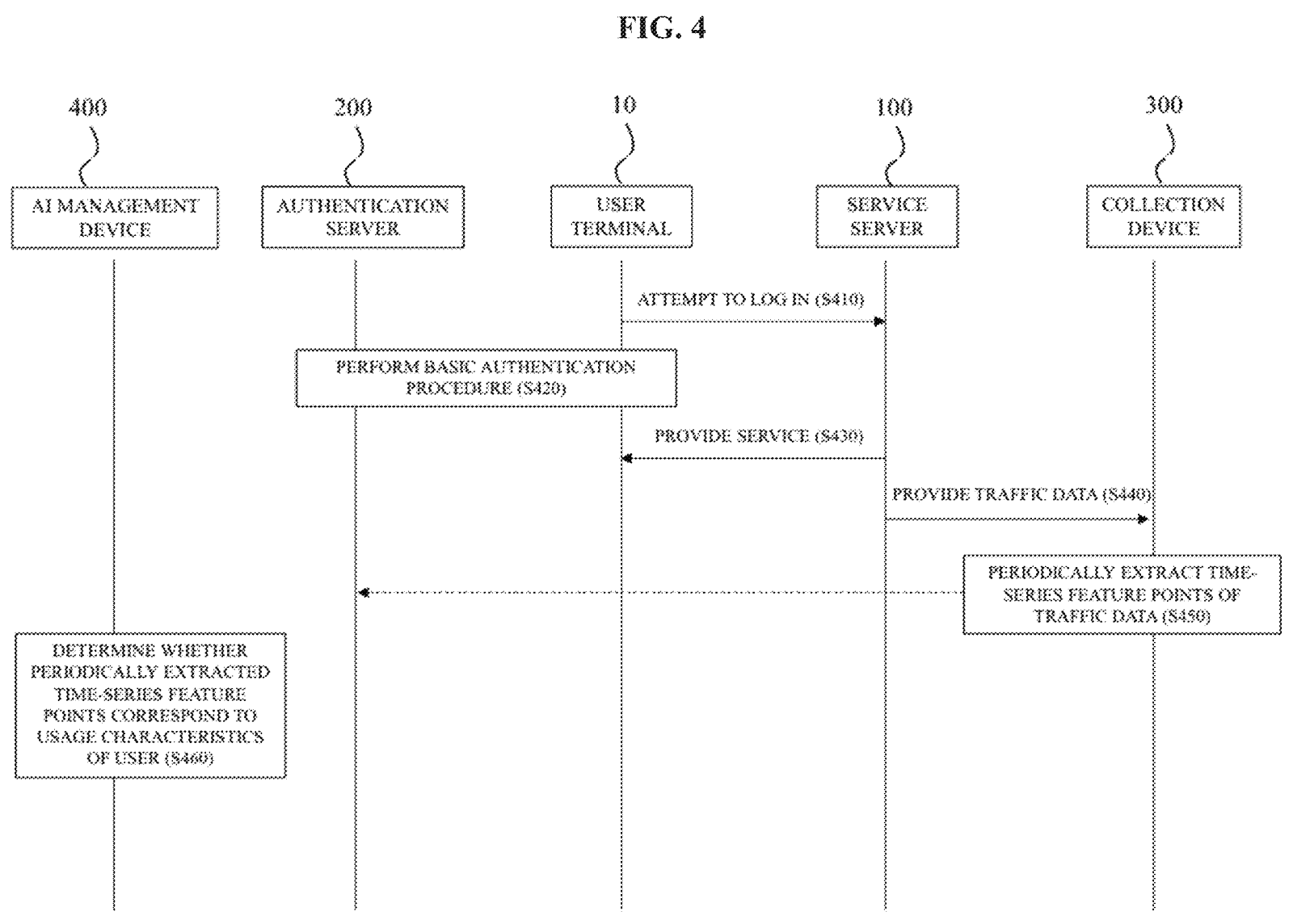

FIG. 4 is a sequence diagram illustrating a process in which the system compares traffic data of a user with usage characteristics of the user according to an exemplary embodiment of the present disclosure. FIG. 4 assumes that a traffic character template of the user is defined through the above-described exemplary embodiments of FIGS. 2A and 2B and an AI model is trained accordingly.

Referring to FIG. 4, in a process for providing a service through at least one terminal of a user, an operation S410 of attempting to log in, an operation S420 of performing a basic authentication procedure, an operation S430 of providing a service, and the like may be performed. In a session in which the service is provided, the collection device 300 may collect traffic data of the terminal (S440).

Here, the collection device 300 may periodically extract time-series feature points of the traffic data (S450).

Then, the authentication server 200 may determine whether the periodically extracted time-series feature points correspond to the user's usage characteristics depending on a comparison result between the time-series feature points periodically extracted by the collection device 300 and the traffic character template of the user (S460).

Specifically, the authentication server 200 may input the periodically extracted time-series feature points to the AI model and control the AI management device 400 such that similarity with the traffic character template of the user may be extracted. Alternatively, the authentication server 200 may receive data of the trained AI model from the AI management device 400 and load the AI model itself to extract the similarity.

When the similarity deviates from a reference range (e.g., a reference value or less), the authentication server 200 may determine that the traffic data does not correspond to the user's usage characteristics.

Here, the authentication server 200 may set the terminal matching the traffic data (abnormal traffic) as an abnormal terminal and block the connection (session) with the abnormal terminal. Specifically, the authentication server 200 may transmit a control message for blocking the service provision session for the abnormal terminal to the service server 100 or the network interface. Also, the authentication server 200 may distinguish the traffic data by giving a tag (abnormal data) to the traffic data checked as abnormal traffic.

As a specific example, when authentication is performed in the network interface, the authentication server 200 may transmit a change of authorization (CoA) disconnect message (DM) or the like to the network interface such that the corresponding equipment blocks the access of the abnormal terminal. Also, in the case of a specific application or web service, the authentication server 200 may call a logout application programming interface (API) of the service server 100 which provides the service to expire the authentication token of the abnormal terminal which has authorized access.

However, a request to reconnect the session may be received by the service server 100 or the authentication server 200 from the terminal which is classified as an abnormal terminal and blocked. In this case, the authentication server 200 performs an authentication process again. Here, the authentication server 200 can prevent access account theft and misuse after verifying the user's identity by enforcing an enhanced authentication procedure which is different from the basic authentication procedure in addition to the basic authentication procedure.

Specifically, the authentication server 200 may communicate with the abnormal terminal to additionally perform the enhanced authentication procedure different from the basic authentication procedure. The enhanced authentication procedure may include, but is not limited to, a biometric authentication based on biometric information (e.g., a face, a fingerprint, an iris, voice, or the like) and mobile authentication procedure (e.g., transmit a security code→input the security code through the service server→verify the security code), an authentication procedure employing a certificate interoperating with an external authentication server, a possession-based security key (e.g., a one-time password (OTP)), and the like. As described above, the network access control system according to the present disclosure can perform a preparatory authentication process for coping with a security threat even when a password or the like used in the basic authentication procedure or the like is exposed.

Unless the identity is successfully verified in accordance with the enhanced authentication procedure, the connection of the terminal may not be unblocked.

However, when the abnormal terminal passes through the enhanced authentication procedure, the authentication server 200 may set the abnormal terminal as a normal terminal and also unblock the connection (access) of the abnormal terminal such that the service server 100 may resume providing the service.

In this case, the AI management device 400 may train the AI model on the basis of the traffic data of the terminal which is set as an abnormal terminal to update the traffic character template of the user. The updated traffic character template or the AI model is used in a subsequent process to determine whether traffic data of the user corresponds to the usage characteristics of the user.

In this way, the network access control system according to the present disclosure continuously performs AI training on the basis of retraining data and regenerates a user identification model (AI model) based on traffic data to increase accuracy of a user identification function in the corresponding scope. Here, the AI management device 400 may use the above-described dataset which is tagged as abnormal traffic for model validation.

Figure 5:
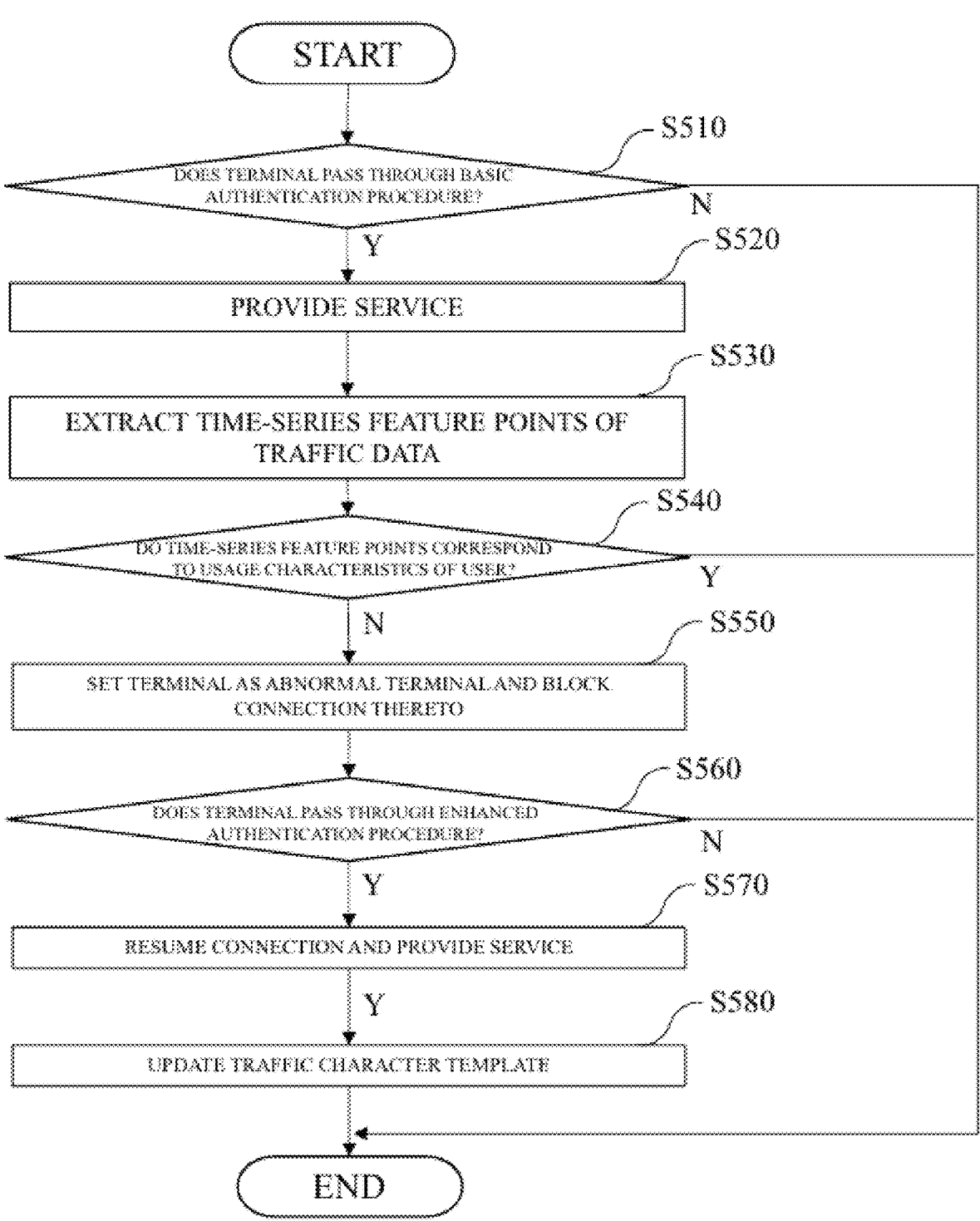
FIG. 5 is a flowchart illustrating a process in which the system performs at least one of a basic authentication procedure, a usage characteristic comparison procedure, and an enhanced authentication procedure according to an exemplary embodiment of the present disclosure.

FIG. 5 is a flowchart illustrating a process in which the system performs at least one of a basic authentication procedure, a usage characteristic comparison procedure, and an enhanced authentication procedure according to an exemplary embodiment of the present disclosure. FIG. 5 assumes that a traffic character template of a user has been defined.

Referring to FIG. 5, when a terminal matching the user passes through a basic authentication procedure (S510—Y), the service server 100 may provide a service to the terminal (S520).

During the service provision process, the collection device 300 may collect traffic data of the terminal in real time and also extract time-series feature points of the traffic data (S530). Here, time-series feature points of the collected traffic data may be extracted at certain time intervals.

Specifically, a traffic dataset may be acquired by refining traffic data, and time-series feature points may be extracted regarding a plurality of items of the traffic data set.

Then, the authentication server 200 may determine whether the foregoing traffic data corresponds to usage characteristics of the user through the AI model of the AI management device 400 (S540). Specifically, the authentication server 200 may compare the time-series feature points of the traffic data with the previously generated traffic character template of the user to determine whether the traffic data corresponds to the usage characteristics of the user.

When the traffic data does not correspond to the usage characteristics (S540—N), the authentication server 200 may set the terminal as an abnormal terminal and block the connection (S550). Specifically, the authentication server 200 may control the service server 100 or the network interface to block a session for providing the service to the abnormal terminal.

Here, when a request to reconnect the session (e.g., resume the service) is received from the terminal, the authentication server 200 may perform an enhanced authentication procedure.

When the terminal passes through the enhanced authentication procedure (S560—Y), the authentication server 200 may cancel the setting of the abnormal terminal and also control the service server 100 to resume the connection with the terminal and provide the service.

When the terminal set as an abnormal terminal passes through the enhanced authentication procedure, the AI management device 400 may retrain the AI model on the basis of the traffic data of the terminal and update the traffic character template of the user.

Meanwhile, the above-described procedure in which the terminal is set as an abnormal terminal due to the inconsistency with the usage characteristics (e.g., the traffic character template) of the user and then passes through the enhanced authentication procedure to be reconnected and receive the service again may be defined as reconnection in accordance with the enhanced authentication procedure.

In this regard, the authentication server 200 may store each user's history of reconnection in accordance with the enhanced authentication procedure and set a different type of enhanced authentication procedure applied to each user depending on the user's history of reconnection in accordance with the enhanced authentication procedure.

Specifically, the authentication server 200 may set a different type of enhanced authentication procedure applied to the user depending on the number of times the connection of at least one terminal matching the user is blocked (due to inconsistency with the usage characteristics), the number of times the connection is resumed in accordance with the enhanced authentication procedure, a pattern of changes in the similarity of traffic data over the course of the connection being resumed several times in accordance with the enhanced authentication procedure, and the like.

For example, a first value may be calculated in proportion to the number of times the connection of at least one terminal matching the user is blocked, and a second value may be calculated in proportion to the number of times the connection is resumed in accordance with the enhanced authentication procedure. Also, a third value may be calculated in proportion to a gradual increase in the similarity of traffic data over the course of the connection being resumed several times in accordance with the enhanced authentication procedure.

Here, the authentication server 200 may calculate a value of authentication necessity on the basis of the first to third values. Also, the authentication server 200 may set a type of enhanced authentication procedure in accordance with the value of authentication necessity.

Specifically, the authentication server 200 may set a lower value of authentication necessity for a larger ratio of the second value to the first value and set a higher value of authentication necessity for a smaller ratio of the second value to the first value. As a result, when the possibility of success of the enhanced authentication process while the connection is blocked is high, a relatively low value of authentication necessity may be set.

Also, when the third value is larger, the authentication server 200 may set a lower value of authentication necessity. As a result, when similarity with the usage characteristics of the user gradually increases during a continuous training process of the AI model, the value of authentication necessity may be set relatively low.

The authentication server 200 may store information on enhanced authentication methods that are preset for sections of values of authentication necessity. An enhanced authentication method that causes more user fatigue may be set for a section of high values of authentication necessity, and an enhanced authentication method that causes less user fatigue may be set for a section of low values of authentication necessity. For example, for a value of authentication necessity in the first section, an enhanced authentication method may be performed on the basis of a possession-based means, such as an OTP, a security key, or the like, and for a value of authentication necessity in the second section which is higher than in the first section, an enhanced authentication method on the basis of biometric authentication may be performed in addition to an enhanced authentication method based on a possession-based means.

For example, with regard to a user who has a value of authentication necessity in the first section, it is assumed that traffic data of a terminal of the user does not correspond to usage characteristics of the user and the connection of the terminal is blocked. In this case, for the terminal of the user who attempts reconnection, the authentication server 200 may employ an enhanced authentication method based on a possession-based means, such as an OTP, a security key, or the like, performing an enhanced authentication procedure.

On the other hand, with regard to a user who has a value of authentication necessity in the second section, it is assumed that traffic data of a terminal of the user does not correspond to usage characteristics of the user and the connection of the terminal is blocked. In this case, for the terminal of the user who attempts reconnection, the authentication server 200 may perform not only an enhanced authentication procedure based on a possession-based means, such as an OTP, a security key, or the like, but also an enhanced authentication procedure based on biometric authentication, and may resume the connection only when the terminal of the user passes through both enhanced authentication procedures.

According to the above-described embodiments, the network access control system of the present disclosure can flexibly change an enhanced authentication procedure in accordance with authentication necessity to perform an appropriate enhanced authentication procedure for each user's environment or authentication history.

Meanwhile, one or more of the various embodiments described above may be implemented in combination as long as the embodiments are not inconsistent with or contradictory to each other.

The various embodiments described above may be implemented in a recording medium that is readable by a computer or a similar device thereto using software, hardware, or a combination thereof.

According to hardware implementation, the embodiments described herein may be implemented using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and other electrical units for performing functions.

In some cases, the embodiments described herein may be implemented as a processor itself. According to software implementation, the embodiments such as procedures and functions described herein may be implemented as separate software modules. Each of the software modules may perform the one or more functions and operations described herein.

Meanwhile, computer instructions or computer programs for performing operations of the service server 100, the authentication server 200, the collection device 300, the AI management device 400, and the like according to the various embodiments of the present disclosure described above may be stored in a non-transitory computer-readable medium. The computer instructions or computer programs stored in the non-transitory computer-readable medium cause a specific device to perform operations of the service server 100, the authentication server 200, the collection device 300, the AI management device 400, and the like according to the various embodiments of the present disclosure described above when executed by a processor of the specific device.

The non-transitory computer-readable medium is a medium that stores data semi-permanently and is readable by a device rather than a medium that stores data for a short time period such as a register, a cache, a memory, or the like. Examples of the non-transitory computer-readable medium may be a compact disc (CD), a digital versatile disc (DVD), an HDD, a Blu-ray disc, a USB memory, a memory card, a ROM, and the like.

A network access control system according to the present disclosure is an authentication system with an AI model that can analyze a user's behavior characteristics, that is, long-term traffic logs generated in the process of using a service, to generate a traffic character template and perform ML on the template to verify similarity. Accordingly, it is possible to identify and block disguised users.

A network access control technology according to the present disclosure is a characterization technology for performing deep learning on network usage patterns of trusted users to classify character points (no singularities), that is, characters, into multiple layers. This technology corresponds to a whitelist method of generating a template from classified character points, comparing real-time traffic generated from a user with template values, and requiring enhanced reauthentication when the similarity deviates from an allowance range. Security products employing profiles based on users' network behavior according to the related art are not effective because they fail to minimize false positive errors to a useful level. This is because traffic exchanged during a specific valid time period is not reiterative or biased enough to profile a single individual. When a whitelist is used according to the present disclosure, access control is based on a statistical probability of distribution rather than identicalness, and thus it is possible to minimize false positives to a useful level.

Although exemplary embodiments of the present invention have been illustrated and described above, the present disclosure is not limited thereto. Without departing from the subject matter of the present disclosure, various modifications can be made by those of ordinary skill in the art, and the modifications should not be construed as separate from the technical spirit or perspective of the present disclosure.

What is claimed is:

1. A system for network access control, the system comprising:
   a service server configured to provide a service to at least one user terminal;
   a collection device configured to acquire traffic data of the at least one user terminal from at least one of the service server and a network interface connected to the service server, acquire a traffic dataset by refining the acquired traffic data in accordance with correlation, and extract time-series feature points of the traffic dataset;
   an artificial intelligence (AI) management device configured to train at least one AI model to define a traffic character template of the user on the basis of the time-series feature points; and an authentication server configured to determine whether the periodically extracted time-series feature points correspond to the user's usage characteristics depending on a comparison result between time-series feature points periodically extracted by the collection device and the traffic character template of the user,
   wherein the authentication server performs a basic authentication procedure of at least one terminal matching the user, and when the terminal passes through the basic authentication procedure and it is determined that the traffic data of the terminal does not correspond to the user's usage characteristics as a result of comparison with the traffic character template of the user, sets the terminal as an abnormal terminal and transmits a control message to the service server or the network interface to block a connection with the abnormal terminal.

2. The system of claim 1, wherein the collection device extracts the user's feature points regarding each of a plurality of time-series items acquired in accordance with a feature point element including at least one of a data usage characteristic, a data transmission volume characteristic, an application usage characteristic, and a terminal characteristic.

3. The system of claim 2, wherein the AI model generates the traffic character template of the user in accordance with a distance vector based on a difference between the user's feature points and a distribution of a plurality of user's feature points regarding each of the plurality of time-series items.

4. The system of claim 1, wherein the authentication server communicates with the abnormal terminal to additionally perform an enhanced authentication procedure which differs from the basic authentication procedure, and when the abnormal terminal passes through the enhanced authentication procedure, the AI management device trains the AI model on the basis of the traffic data of the abnormal terminal to update the traffic character template of the user.

5. The system of claim 1, wherein the authentication server compares the periodically extracted time-series feature points with the traffic character template of the user through the AI model to acquire similarity and determines whether the periodically extracted time-series feature points correspond to the user's usage characteristics on the basis of the similarity.

* * * * *